(12) United States Patent
Hartmann et al.

(10) Patent No.: US 9,150,142 B2
(45) Date of Patent: Oct. 6, 2015

(54) OPERATING DEVICE AND METHOD OF IMPLEMENTING LIGHTING FUNCTIONS

(71) Applicant: Audi AG, Ingolstadt (DE)

(72) Inventors: Jürgen Hartmann, Gutenstetten (DE); Andreas Stüber, Hofstetten (DE); Patrick Sassmannshausen, Hettenshausen (DE)

(73) Assignee: AUDI AG, Ingolstadt (DE)

( * ) Notice: Subject to any disclaimer, the term of this patent is extended or adjusted under 35 U.S.C. 154(b) by 55 days.

(21) Appl. No.: 13/943,396

(22) Filed: Jul. 16, 2013

(65) Prior Publication Data

US 2014/0029277 A1    Jan. 30, 2014

(30) Foreign Application Priority Data

Jul. 25, 2012    (DE) .......................... 10 2012 014 761

(51) Int. Cl.
*B60Q 1/00*    (2006.01)
*B60Q 1/14*    (2006.01)

(52) U.S. Cl.
CPC .............. *B60Q 1/0076* (2013.01); *B60Q 1/143* (2013.01); *B60Q 1/1461* (2013.01); *B60Q 2300/112* (2013.01); *B60Q 2300/116* (2013.01)

(58) Field of Classification Search
CPC .... B60Q 1/0076; B60Q 1/143; B60Q 1/1461; B60Q 2300/112; B60Q 2300/116
USPC .......................................... 362/464, 465, 466
See application file for complete search history.

(56) References Cited

U.S. PATENT DOCUMENTS

| | | | |
|---|---|---|---|
| 3,876,904 A | 4/1975 | Weber, Jr. | |
| 8,217,774 B2 | 7/2012 | Elias et al. | |

FOREIGN PATENT DOCUMENTS

| | | |
|---|---|---|
| CN | 1935560 A | 3/2007 |
| CN | 1970376 A | 5/2007 |
| DE | 18 14 768 | 6/1970 |
| DE | 1 962 093 | 6/1971 |
| DE | 102011117245 | 4/2012 |
| FR | 2 502 558 | 10/1982 |
| GB | 2476169 | 6/2011 |
| JP | 2000-313275 | 11/2000 |
| JP | 2002-002370 | 1/2002 |

OTHER PUBLICATIONS

Skoda Auto a.s.: Skoda Octavia Instruction Manual, 2011.
Chinese Search Report issued in counterpart Chinese patent application No. 201303108812 on Jun. 3, 2015.
Translation of Chinese Search Report issued in counterpart Chinese patent application No. 201303108812 on Jun. 3, 2015.

*Primary Examiner* — Thomas M Sember
(74) *Attorney, Agent, or Firm* — Henry M. Feiereisen LLC

(57) ABSTRACT

In a method of controlling different lighting functions in a vehicle, activation of another one of the lighting functions is dependent on an actual speed of the vehicle, when manually switching from a currently activated one of the lighting functions to the other one of the lighting functions. In particular, when a low beam is automatically activated and a predefined speed is exceeded, activation of a parking light is barred while the low beam remains activated.

14 Claims, 3 Drawing Sheets

OPERATING DEVICE AND METHOD OF IMPLEMENTING LIGHTING FUNCTIONS

CROSS-REFERENCES TO RELATED APPLICATIONS

This application claims the priority of German Patent Application, Serial No. 10 2012 014 761.9, filed Jul. 25, 2012, pursuant to 35 U.S.C. 119(a)-(d), the content of which is incorporated herein by reference in its entirety as if fully set forth herein.

BACKGROUND OF THE INVENTION

The present invention relates to the field of controlling lighting functions in a vehicle.

The following discussion of related art is provided to assist the reader in understanding the advantages of the invention, and is not to be construed as an admission that this related art is prior art to this invention.

Modern vehicles have driver assist systems to alert the driver when, e.g., the driver has not buckled up or when the fuel tank is on reserve. More sophisticated systems can warn the driver about a danger condition near the vehicle and can involve an acoustic signal or a warning light in the event of, e.g., a pedestrian walking in a dark street.

To date, driver assist systems are developed to further provide comfortable driving conditions for the driver. For example, there are systems which recognize not only that the surroundings are dark but also that the vehicle negotiates a curve at a certain speed so that the light cone of the light is adjusted by the driver assist system, i.e. the light cone on the left side of the vehicle is for example enlarged to better illuminate the curb. This requires however that the driver has switched on the low beam, for example when the driver selects the function "Auto", which means that the low beam is switched on or off depending on the ambient environmental conditions. This may be realized using e.g. a rotary light switch having a rotary knob to alternate between the various modes.

FIG. 1 shows an exemplary rotary light switch having various lighting functions. Reference numeral 1 indicates "Light Off", reference numeral 2 indicates "Auto", reference numeral 3 indicates "Parking Light", reference numeral 4 indicates "Low Beam", and reference numerals 5 or 6 indicate in combination with low beam 4 the mode "Low Beam +Fog lamp". Such a rotary light switch may be integrated in a module 7, as shown by way of example in FIG. 1 or may be attached to the steering wheel. Operation of such a rotary light switch in a conventional manner is problematic in certain circumstances. For example, when the setting "Auto" is selected and the low beam is activated, there may be circumstances that require the driver during travel at night or because of other conditions to switch on the fog lamps. For that purpose, the rotary light switch has to be switched from the position "Auto" to the position "low beam +fog lamp", i.e. the driver has to turn the rotary light switch from the position 2 "Auto" past the position 3 "Parking Light" to the position 4 "low beam". The rotary knob 9 of the rotary light switch is then pulled out and moved to either the position 5 or 6. The arrangement or sequence of the lighting functions as shown in FIG. 1 is required by law so that activation of the low beam is always preceded by activation of the parking light. As a result, a switching from "Auto" to "Low Beam" or "Low Beam +Fog lamp" involves also activation of the parking light so that for a certain time period the bright low beam is replaced by a substantially darker parking light. Regardless how brief this time period is, this situation involves risk.

It would therefore be desirable and advantageous to address this problem and to obviate other prior art shortcomings.

SUMMARY OF THE INVENTION

According to one aspect of the present invention, a method of controlling different lighting functions in a vehicle includes activating another one of the lighting functions in dependence on an actual speed of the vehicle, when manually switching from a currently activated one of the lighting functions to the other one of the lighting functions.

The present invention resolves prior art problems by allowing a switching between different lighting functions only in dependence on the actual speed. As a result, the safety aspect is enhanced during travel because the on and off of lighting functions can be controlled automatically. During travel, especially in conditions that require the low beam to be activated, proper visibility is ensured and does not deteriorate when switching from one lighting function to another lighting function. There is no increased risk for accident.

According to another advantageous feature of the present invention, an active state of the currently activated one of the lighting functions can be maintained and the activation of the other one of the lighting functions is barred, when the actual speed of the vehicle exceeds a predefined speed during switching from the currently activated lighting function to the other lighting function. This has the benefit that in the event the speed of the vehicle exceeds the predefined speed, the actually set lighting function is retained even though a different lighting function is requested. This further enhances the safety aspect during travel.

According to another advantageous feature of the present invention, the currently activated one of the lighting functions is normally the function "Auto" in which a low beam is automatically switched on in dependence on existing environmental conditions and the low beam is active. Advantageously, the other one of the lighting functions is normally the lighting function "Parking Light". As a result, when the position "Auto" is set and the low beam is switched on, a change to the other lighting function, like e.g. "Parking Light" does not occur, when the predefined speed is exceeded. Visibility does therefore not deteriorate, even when switching to a lighting function of reduced visibility.

According to another advantageous feature of the present invention, the lighting functions can involve the functions "off", "Auto", "Parking Light", "Low Beam", and "Low Beam +Fog lamp". The afore-described arrangement of the lighting functions complies with legal requirements and is advantageous with respect to the implementation of turning on and off the light in the vehicle.

According to another aspect of the present invention, an operating device for controlling lighting functions in a vehicle is configured for switching between the lighting functions, wherein activation of another one of the lighting functions is dependent on an actual speed of the vehicle, when manually switching from a currently activated one of the lighting functions to the other one of the lighting functions.

According to another advantageous feature of the present invention, switching from the currently set lighting function to the other lighting function can be realized by a switch, e.g. a rotary switch. Advantageously, the operating device is configured as a rotary switch module.

According to another advantageous feature of the present invention, a control unit may be provided to analyze the actual position of the switch and/or the actual speed of the vehicle.

According to still another aspect of the present invention, a vehicle includes an operating device for controlling lighting functions in the vehicle, the operating device being configured for switching between the lighting functions, wherein activation of another one of the lighting functions is dependent on an actual speed of the vehicle, when manually switching from a currently activated one of the lighting functions to the other one of the lighting functions.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
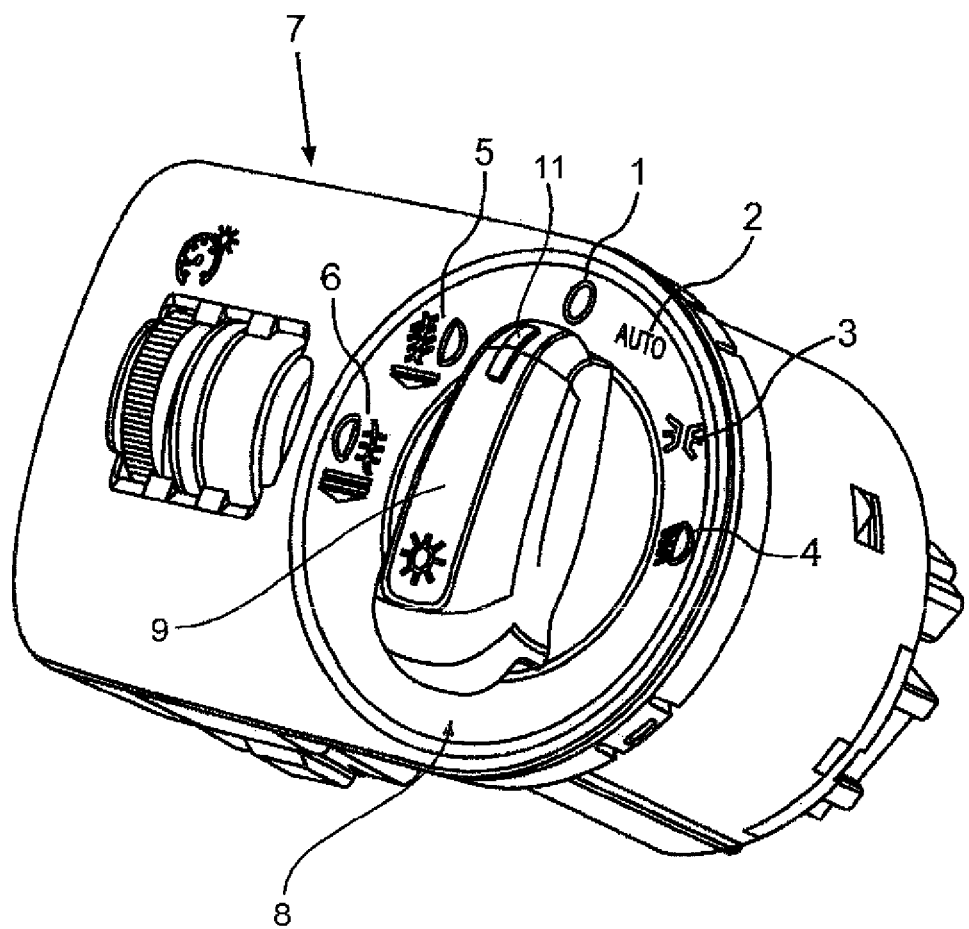
FIG. 1 is a perspective illustration of a rotary light switch module configured to execute a method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and again to FIG. 1, there is shown a perspective illustration of a rotary light switch module, generally designated by reference numeral 7 and configured to execute a method according to the present invention. The rotary light switch module 7 has a rotary light switch 8 with a rotary knob 9 to switch between various lighting functions, such as "Light Off" (position 1), "Auto" (position 2), "Parking Light" (position 3), "Low Beam" (position 4), and in combination with low beam (position 4) the mode "Low Beam +Fog lamp" (position 5 or 6).

The rotary light switch module 7 represents part of an operating device and is an easily replaceable single-piece structure. It represents a component which may interact with other modules or functionalities in the vehicle via respective interfaces. The provision of such a module is beneficial because it can easily be replaced by a newer module which may be more sophisticated or because the module is defective. New modules can also easily be added as a result of the presence of standardized interfaces.

Figure 3:
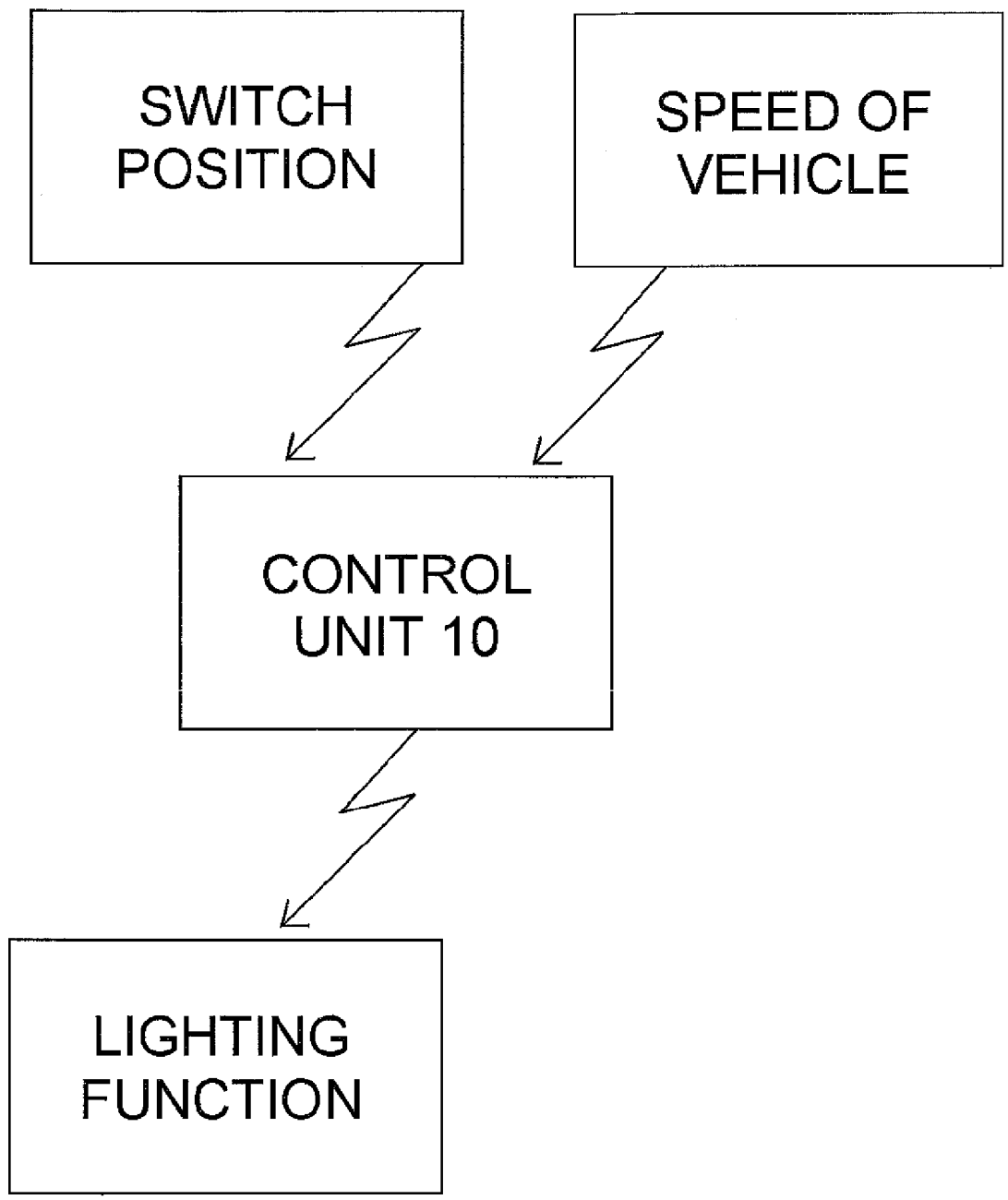
FIG. 3 is a block diagram showing a relationship between components of the method according to the present invention.

The operating device can further include a control unit 10, capable of analyzing the actual switch position and/or actual speed of the vehicle. This is shown in FIG. 3. The control unit 10 can be configured to receive the switch position and/or actual speed of the vehicle, analyze it, and as a result send a command for activating or ignoring activation of the parking light. The control unit 10 may also be constructed to recognize by itself the actual switch position and/or actual speed of the vehicle, to analyze it and then to output the respective command with respect to the parking light.

It will be understood by persons skilled in the art that the illustrated rotary light switch module 7 is only an example for use as part of an operating device for implementing the method according to the present invention. Other types of switches are, of course, also conceivable, e.g. jog controls.

Figure 2:
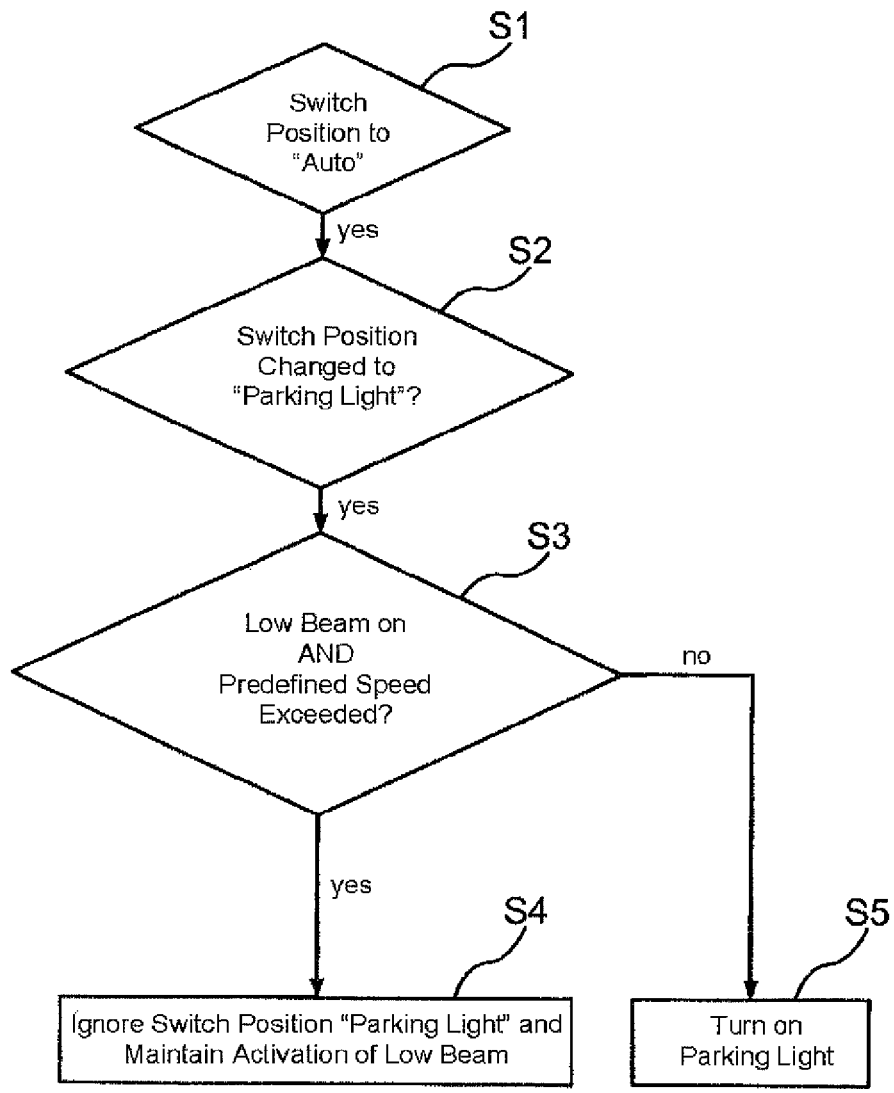
FIG. 2 is a sequence diagram of the method according to the present invention.

The method according to the present invention is illustrated schematically by way of a sequence diagram in FIG. 2.

It is assumed that the rotary knob 9 is set to the lighting function "Auto". This represents the preferred setting. The presence of this setting is checked in step S1. When recognizing in step S2 that a switch is intended from this position to the lighting function "Parking Light" and in addition it is recognized in step S3 that the low beam is active in view of the ambient conditions and a predefined limit speed is exceeded, the parking light is not activated in step S4, i.e. the parking light is not turned on. Otherwise, the parking light is turned on in step S5. In other words, the switch position 3 "Parking Light: is ignored when the low beam is turned on and the predefined speed is exceeded, and the low beam remains activated, even though the rotary knob 9 may have been moved to the position 3 to activate the parking light.

Advantageously, the method according to the present invention can be configured in such a way that the parking light can be activated only when the vehicle is at a standstill or travels up to a predefined speed which when exceeded causes the low beam to remain active, even when the lighting function "Parking Light" is set.

As described above, legal requirements demand that activation of the low beam has to be preceded by the activation of the parking light. To comply with this requirement, the sequence of the lighting functions is for example "Auto" (position 2), "Parking Light" (position 3), "Low Beam" (position 4), and in combination with low beam (position 4) the mode "Low Beam +Fog lamp" (position 5 or 6). This sequence is not necessarily required so long as the legal requirements are complied with. It is also conceivable to add further lighting functions in addition to the afore-mentioned lighting functions.

A vehicle (not shown) may be equipped with an operating device according to the present invention, with the operating device including the afore-described control unit 10 in part or entirely. It is, of course, also conceivable to equip a vehicle with an operating device according to the present invention without control unit and with a separate control unit which is not part of the operating device but used for evaluation as to whether or not the parking light is activated.

The control unit 10 may be attached together with the operating device in e.g. a rotary light switch module or may belong to the operating device only in part or installed in the vehicle completely separate from the operating device, e.g. in combination with another control unit or as part of another control unit, so long as the control unit is capable to analyze the switch position, i.e. the demanded lighting function, and also the vehicle speed and to output the respective commands for turning on or off the lighting functions, e.g. the parking light or low beam.

When the control unit 10 recognizes that the driver moves the rotary knob from the position 2 "Auto" to the position 3 "Parking Light" and that a predefined speed is exceeded and the low beam is on as a result of e.g. ambient conditions, the control unit 10 maintains illumination of the low beam, i.e. turning on of the parking light is ignored, despite the action by the driver.

In the following, a concrete example of a method according to the present invention and an operating device according to the present invention will now be described.

Setting of the lighting functions in the vehicle, i.e. turning on or off of low beam, parking light, and fog lamp, is normally executed by hand, using a switch, e.g. a rotary switch. The switch may be arranged at different locations in the vehicle, e.g. on the steering wheel or as rotary light switch module next to the steering wheel at a location that can easily be reached by the driver. When the switch is constructed as rotary light switch module 7, as shown in FIG. 1, the normal position of the switch is "Light Off" or "0" (position 1). In this position, the marking 11 of the rotary knob 9 points normally upwards.

When the driver intends to turn on the light, the rotary knob 9 is turned, normally to the right, until reaching the desired lighting function, at which point the marking 11 is in alignment with the selected lighting function. This may in addition also be accompanied by e.g. an acoustic or haptic signal. Normally, the first lighting function to be turned on is the light function "Auto" which involves an automatic turning on or off of the low beam depending on prevailing conditions. When the rotary knob 9 is oriented towards "Auto", light is OFF at daylight and ON at night or e.g. when driving through a tunnel. This constitutes the most comfortable setting for the driver.

When intending to turn on the lighting function "parking light", the driver moves the rotary knob 9 further to the right until the marking 11 is in alignment with this lighting function. In the event, the initial setting is not to position 2 "Auto", i.e. the low beam should not be automatically turned on (using the position 2 "Auto"), the driver has to move the rotary knob 9 from the normal position 1 via the position 2 "Auto" and the position 3 "Parking Light" to the position 4 "Low Beam", i.e. until the marking 11 is in alignment with the lighting function "Low Beam". In this position of the rotary knob 9, the low beam is continuously on.

When now ambient conditions require turning on of the fog lamp, i.e. either rear fog lamp 5 or front fog lamp 6, the rotary knob 9 has to be moved to the position 4 "Low Beam" and then pulled out once or twice, even when the rotary knob 9 is in the position 2 "Auto". Pulling the rotary knob 9 outwards once normally results in illumination of the rear fog lamp 5 whereas pulling the rotary knob 9 outwards twice causes additional illumination of the front fog lamp 6.

There are travel conditions that require illumination of the rear fog lamp 5 and even front fog lamp 6. When the position 2 "Auto" has been set, the driver has to move the rotary knob 9 as described above from this position to the position 4 "Low Beam" and pulling of the rotary knob accordingly. Due to legal requirements, this involves a movement of the rotary knob 9 past the position 3 "Parking Light". As a result, for a certain time period, activation of the parking light would darken the low beam, causing a deterioration in visibility for the driver during this time period. This poses a risk that may unsettle or irritate the driver and may even cause the driver to stop moving the rotary knob 9 so that the rotary knob 9 may conceivably stay at the setting "Parking Light". This risk is prevented by the present invention by barring activation of the parking light when the low beam is activated and a predefined speed is exceeded, as the low beam remains on, i.e. the position 3 "Parking Light" is ignored, even though the marking 11 is in alignment with the position 3.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of controlling different lighting functions in a vehicle, comprising:

activating another one of the lighting functions in dependence on an actual speed of the vehicle, when manually switching from a currently activated one of the lighting functions to the other one of the lighting functions; and maintaining an active state of the currently activated one of the lighting functions and barring the activation of the other one of the lighting functions by ignoring the other one of the lighting functions, when the actual speed of the vehicle exceeds a predefined speed during switching from the currently activated one of the lighting functions to the other one of the lighting functions.

2. The method of claim 1, wherein the currently activated one of the lighting functions represents the function "Auto" in which a low beam is automatically switched on in dependence on prevailing environmental conditions, and the low beam is active.

3. The method of claim 1, wherein the other one of the lighting functions represents the lighting function "Parking Light".

4. The method of claim 1, wherein the lighting functions involve the functions "Off", "Auto", "Parking Light", "Low Beam", and "Low-Beam+Fog+lamp".

5. An operating device for controlling lighting functions in a vehicle, comprising means configured for switching between the lighting functions, wherein activation of another one of the lighting functions is dependent on an actual speed of the vehicle, when manually switching from a currently activated one of the lighting functions to the other one of the lighting functions, wherein the means is configured to maintain an active state of the currently activated one of the lighting functions and barring the activation of the other one of the lighting functions by ignoring the other one of the lighting functions, when the actual speed of the vehicle exceeds a predefined speed when switching from the currently activated one of the lighting functions to the other one of the lighting functions.

6. The operating device of claim 5, wherein the means is a switch.

7. The operating device of claim 5, wherein the means is a rotary switch.

8. The operating device of claim 5, wherein the means is a rotary switch module.

9. The operating device of claim 6, further comprising a control unit constructed to analyze at least one of an actual position of the switch and an actual speed of the vehicle.

10. A vehicle, comprising an operating device for controlling lighting functions in the vehicle, said operating device configured for switching between the lighting functions, wherein activation of another one of the lighting functions is dependent on an actual speed of the vehicle, when manually switching from a currently activated one of the lighting functions to the other one of the lighting functions, wherein the operating device is configured to maintain an active state of the currently activated another one of the lighting functions and barring the activation of the other one of the lighting functions by ignoring the other one of the lighting functions, when the actual speed of the vehicle exceeds a predefined speed when switching from the currently activated one of the lighting functions to the other one of the lighting functions.

11. The vehicle of claim 10, wherein the operating device is a switch.

12. The vehicle of claim 10, wherein the operating device is a rotary switch.

13. The vehicle of claim 10, wherein the operating device is a rotary switch module.

14. The vehicle of claim 11, further comprising a control unit constructed to analyze at least one of an actual position of the switch and an actual speed of the vehicle.

\* \* \* \* \*